(12) United States Patent
Petersen

(10) Patent No.: US 7,244,811 B2
(45) Date of Patent: Jul. 17, 2007

(54) METHOD FOR THE TREATMENT OF POLYAZOLE FILMS

(75) Inventor: Joachim Petersen, Fulda (DE)

(73) Assignee: PEMEAS GmbH (DE)

( * ) Notice: Subject to any disclaimer, the term of this patent is extended or adjusted under 35 U.S.C. 154(b) by 0 days.

(21) Appl. No.: 10/522,503

(22) PCT Filed: Jul. 25, 2003

(86) PCT No.: PCT/EP03/08250

§ 371 (c)(1),
(2), (4) Date: Jun. 27, 2005

(87) PCT Pub. No.: WO2004/013211

PCT Pub. Date: Feb. 12, 2004

(65) Prior Publication Data

US 2006/0167219 A1    Jul. 27, 2006

(30) Foreign Application Priority Data

Jul. 27, 2002    (DE) ................... 102 34 236

(51) Int. Cl.
*C08F 6/00* (2006.01)

(52) U.S. Cl. ............... 528/480; 210/500.21; 210/640; 528/378; 528/400

(58) Field of Classification Search ........... 210/500.21, 210/640; 528/378, 400
See application file for complete search history.

(56) References Cited

U.S. PATENT DOCUMENTS

| | | | | |
|---|---|---|---|---|
| 1,375,815 | A | * | 4/1921 | Bethke ................. 396/317 |
| 2,413,559 | A | | 12/1946 | Greenlees |
| 4,494,842 | A | * | 1/1985 | Kimura et al. ............ 396/410 |
| 4,579,435 | A | * | 4/1986 | Haraguchi ............... 396/410 |
| 4,927,909 | A | | 5/1990 | Wadhwa et al. |
| 5,965,485 | A | * | 10/1999 | Mizumachi et al. ........ 503/227 |
| 2004/0186189 | A1 | * | 9/2004 | Muller et al. .............. 521/27 |
| 2005/0058771 | A1 | * | 3/2005 | Herron et al. ............ 427/96.1 |

FOREIGN PATENT DOCUMENTS

| | | |
|---|---|---|
| CA | 2 477 864 | 9/2003 |
| CA | 2 478 530 | 9/2003 |
| DE | 102 09 419 | 9/2003 |
| DE | 102 10 499 | 9/2003 |

* cited by examiner

*Primary Examiner*—Terressa Boykin
(74) *Attorney, Agent, or Firm*—Connolly Bove Lodge & Hutz LLP

(57) ABSTRACT

The present invention relates to a process for the treatment of polyazole films, in which a film is passed at least twice through a trough filled with a liquid, with the film being unrolled from a spool and rolled up on a further spool and the direction of travel of the film is changed during the treatment by altering the direction of rotation of the spools.

21 Claims, 1 Drawing Sheet

METHOD FOR THE TREATMENT OF POLYAZOLE FILMS

RELATED APPLICATIONS

This application is a national stage application (under 35 U.S.C. 371) of PCT/EP03/008250 filed Jul. 25, 2003, which claims benefit to German application number 102 34 236.9 filed Jul. 27, 2002.

The present invention relates to a process for the treatment of polyazole films with liquids.

Owing to their excellent chemical, thermal and mechanical properties, acid-doped polymer membranes can be used in a variety of applications and are particularly suitable as polymer electrolyte membrane (PEM) in PEM fuel cells.

The basic polyazole membranes are doped with concentrated phosphoric acid or sulfuric acid and act as proton conductors and separators in polymer electrolyte membrane fuel cells (PEM fuel cells).

Due to the excellent properties of the polyazole polymer, such polymer electrolyte membranes can, when processed to produce membrane-electrode units (MEUs), be used in fuel cells at long-term operating temperatures above 100° C., in particular above 120° C. This high long-term operating temperature allows the activity of the catalysts based on noble metals which are present in the membrane-electrode unit (MEU) to be increased. Particularly when using reformats of hydrocarbons, significant amounts of carbon monoxide are present in the reformer gas and these usually have to be removed by means of a costly gas work-up or gas purification. The ability to increase the operating temperature enables significantly higher concentrations of CO impurities to be tolerated over the long term.

The use of polymer electrolyte membranes based on polyazole polymers allows, firstly, the costly gas work-up or gas purification to be omitted in some cases and, secondly, the catalyst loading in the membrane-electrode unit to be reduced. Both are dispensable prerequisites for large-scale use of PEM fuel cells, since otherwise the costs of a PEM fuel cell system are too high.

Doping with acids alters the mechanical properties of the film appreciably. Thus, for example, the modulus of elasticity decreases to 10% of the initial value, so that a polyazole film has only a relatively low mechanical stability after doping. In addition, the area of the film increases by up to 50% as a result of doping.

Owing to these problematical properties, these films are doped with acid in a purely manual process by laying the films in a water or acid bath and subsequently changing the liquid bath a number of times.

A problem associated with this method is, inter alia, the high consumption of liquid. Furthermore, processes according to the prior art are not very flexible and are very labor intensive. It should be noted that polyazole films initially display a very low flexibility but this increases greatly on treatment with acids while the mechanical stability is reduced.

Furthermore, such films which are generally cast from organic solvents contain high proportions of solvent residues which can be hazardous to health. In the past, these solvents, for example dimethylacetamide (DMAc) have been removed by drying.

It is therefore an object of the present invention to provide a process which solves the abovementioned problems. The process should allow a simple, safe and reliable treatment of polyazole films.

It is a further object of the present invention to provide a process which is very flexible and can be adapted to the considerable changes in the mechanical behavior of the film occurring during the treatment without thereby increasing the labor requirements.

In addition, the process should have a particularly low consumption of liquid. The process should also be inexpensive.

It is therefore also an object of the present invention to provide a process which makes removal of hazardous solvents possible. In particular, the process should allow both removal of solvents and doping of polyazole films without different plants being necessary.

Furthermore, the process should improve the mechanical stability of polyazole films. These properties include, in particular, the modulus of elasticity, the tear strength and the fracture toughness of the film.

These objects are achieved by a process for the treatment of polyazole films, in which a film is passed at least twice through a trough filled with a liquid, with the film being unrolled from a spool and rolled up on a further spool and the direction of travel of the film is changed during the treatment by altering the direction of rotation of the spools.

Figure 1:
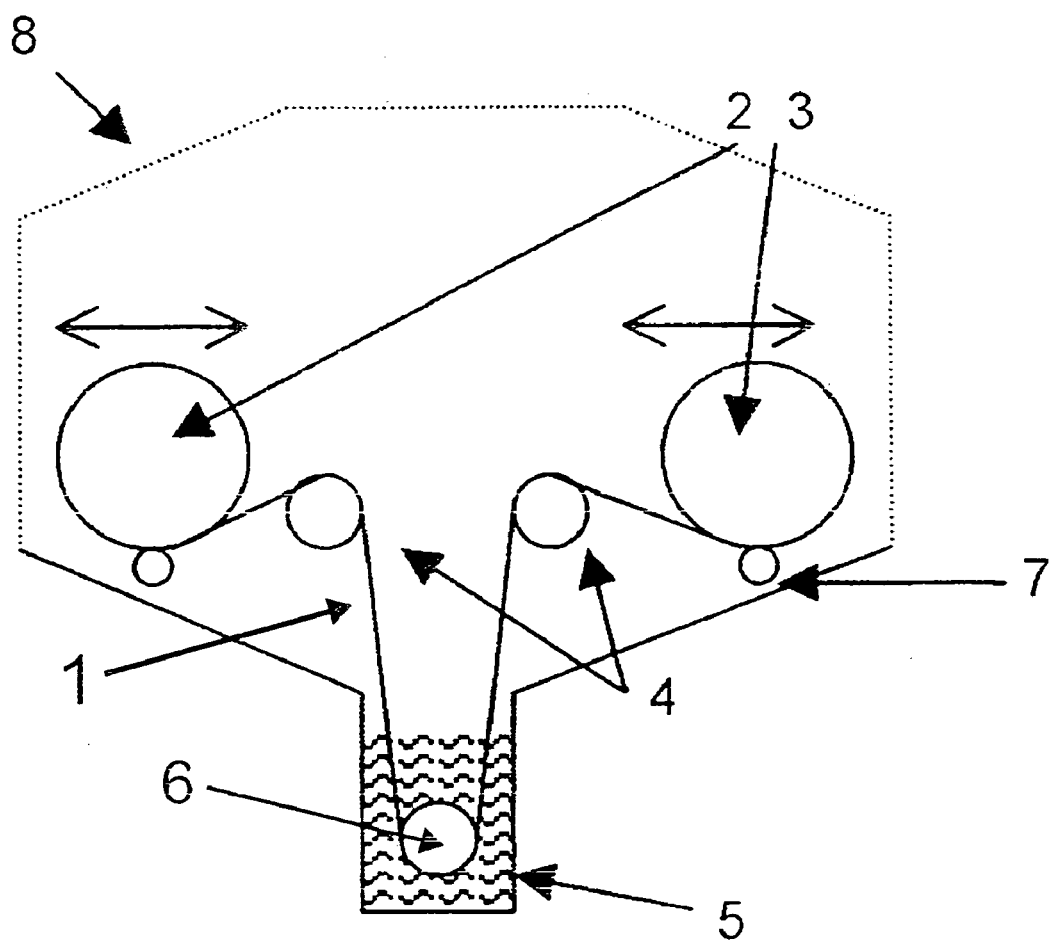
FIG. 1 illustrates a schematic of jigger according to the invention.

In the field of textiles, this procedure is known, for example, in dyeing. However, in contrast to fabrics, a film is not able to take up large amounts of liquid within a short time. Furthermore, textiles essentially retain their mechanical properties and their dimensions alter only slightly during the treatment.

Accordingly, the solution provided by the invention is particularly surprising because the process adapts to the changing properties of the film. In addition, the film comes into contact with the liquid present in the trough for only a very short time without this having an adverse effect on the treatment. Surprisingly, it therefore has to be assumed that the treatment of the film also takes place in the rolled-up state by means of liquid which is rolled up together with the film.

According to the invention, films comprising polyazoles are treated. Before treatment with acid, these films generally comprise at least 50% by weight, preferably 70% by weight, of polyazoles, without this constituting a restriction. Such polymers are known per se.

Polyazoles comprise recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

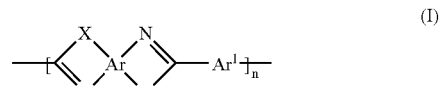

-continued
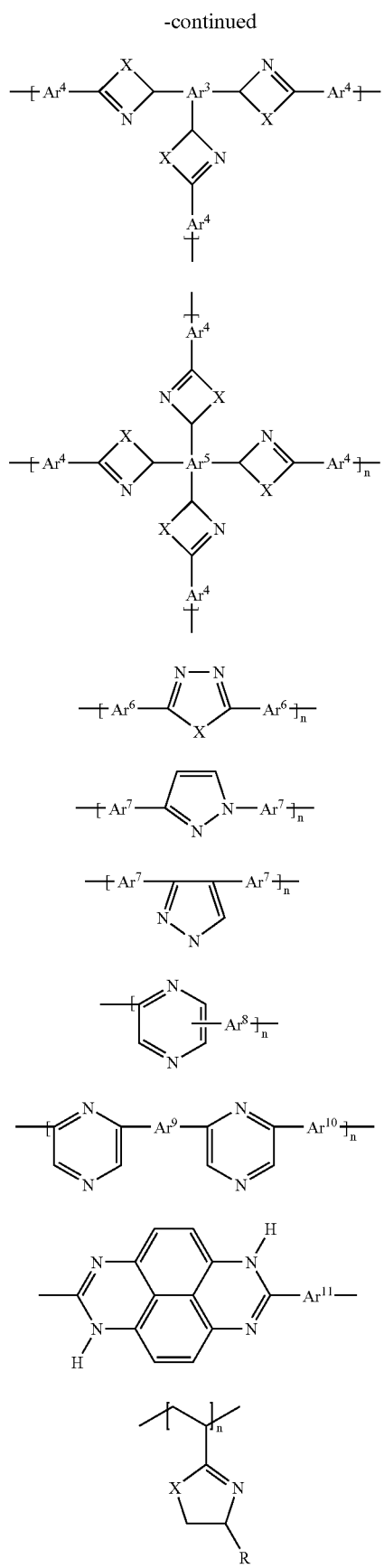
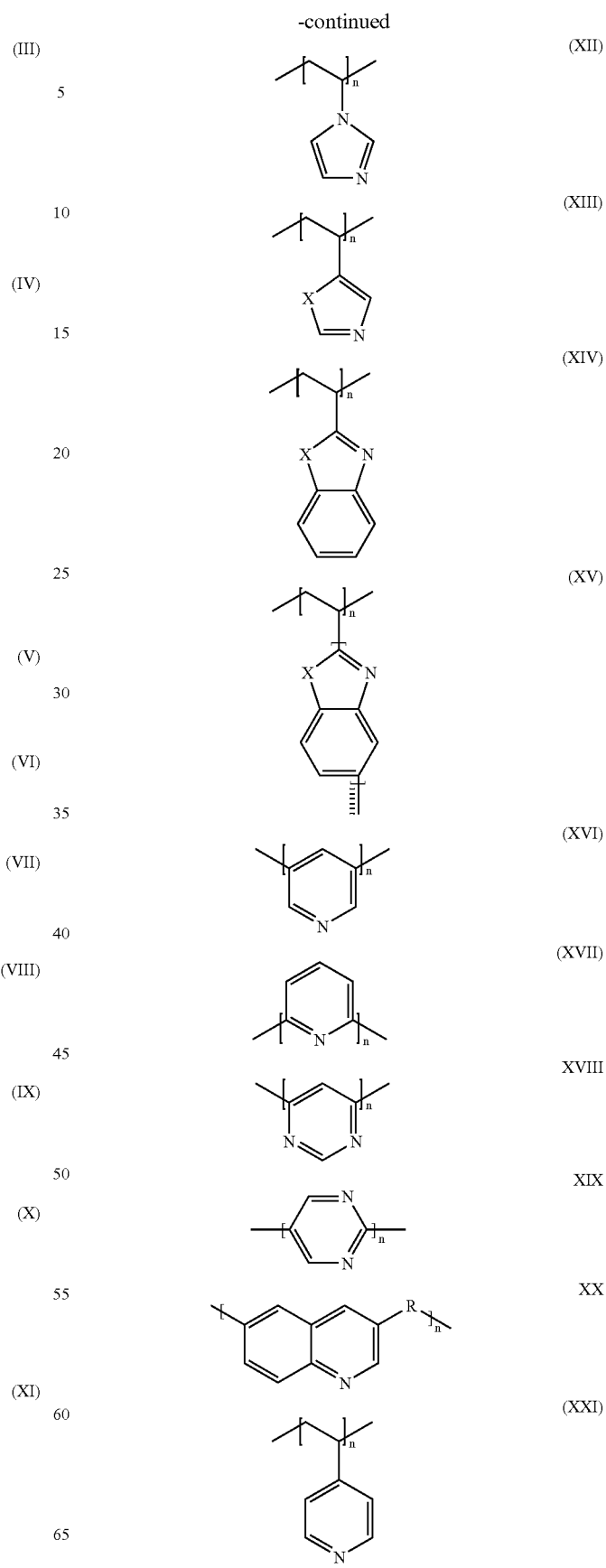

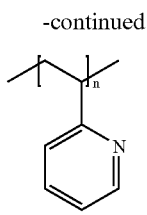 (XXII)

where
the radicals Ar are identical or different and are each a tetravalent aromatic or heteroaromatic group which can be monocyclic or polycyclic,
the radicals $Ar^1$ are identical or different and are each a divalent aromatic or heteroaromatic group which can be monocyclic or polycyclic,
the radicals $Ar^2$ are identical or different and are each a divalent or trivalent aromatic or heteroaromatic group which can be monocyclic or polycyclic,
the radicals $Ar^3$ are identical or different and are each a trivalent aromatic or heteroaromatic group which can be monocyclic or polycyclic,
the radicals $Ar^4$ are identical or different and are each a trivalent aromatic or heteroaromatic group which can be monocyclic or polycyclic,
the radicals $Ar^5$ are identical or different and are each a tetravalent aromatic or heteroaromatic group which can be monocyclic or polycyclic,
the radicals $Ar^6$ are identical or different and are each a divalent aromatic or heteroaromatic group which can be monocyclic or polycyclic,
the radicals $Ar^7$ are identical or different and are each a divalent aromatic or heteroaromatic group which can be monocyclic or polycyclic,
the radicals $Ar^8$ are identical or different and are each a trivalent aromatic or heteroaromatic group which can be monocyclic or polycyclic,
the radicals $Ar^9$ are identical or different and are each a divalent or trivalent or tetravalent aromatic or heteroaromatic group which can be monocyclic or polycyclic,
the radicals $Ar^{10}$ are identical or different and are each a divalent or trivalent aromatic or heteroaromatic group which can be monocyclic or polycyclic,
the radicals $Ar^{11}$ are identical or different and are each a divalent aromatic or heteroaromatic group which can be monocyclic or polycyclic,
the radicals X are identical or different and are each oxygen, sulfur or an amino group bearing a hydrogen atom, a group having 1-20 carbon atoms, preferably a branched or unbranched alkyl or alkoxy group, or an aryl group as further radical,
the radicals R are identical or different and are each hydrogen, an alkyl group or an aromatic group and
n, m are each an integer greater than or equal to 10, preferably greater than or equal to 100.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, each of which may also be substituted.

$Ar^1$, $Ar^4$, $Ar^6$, $Ar^7$, $Ar^8$, $Ar^9$, $Ar^{10}$, $Ar^{11}$ can have any substitution pattern; in the case of phenylene, for example, $Ar^1$, $Ar^4$, $Ar^6$, $Ar^7$, $Ar^8$, $Ar^9$, $Ar^{10}$, $Ar^{11}$ can be ortho-, meta- or para-phenylene. Particularly preferred groups are derived from benzene and biphenylene, each of which may also be substituted.

Preferred alkyl groups are short-chain alkyl groups having from 1 to 4 carbon atoms, e.g. methyl, ethyl, n-propyl or isopropyl and t-butyl groups.

Preferred aromatic groups are phenyl or naphthyl groups. The alkyl groups and the aromatic groups may be substituted.

Preferred substituents are halogen atoms such as fluorine, amino groups, hydroxyl groups or short-chain alkyl groups such as methyl or ethyl.

Preference is given to polyazoles having recurring units of the formula (I) in which the radicals X within a recurring unit are identical.

The polyazoles can in principle also have differing recurring units which, for example, differ in their radical X. However, there are preferably only identical radicals X in a recurring unit.

Further preferred polyazole polymers are polyimidazoles, polybenzothiazoles, polybenzoxazoles, polyoxadiazoles, polyquinoxalines, polythiadiazoles, poly(pyridines), poly (pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising recurring azole units is a polyazole containing only units of the formula (I) and/or (II).

The number of recurring azole units in the polymer is preferably greater than or equal to 10. Particularly preferred polymers comprise at least 100 recurring azole units.

For the purposes of the present invention, preference is given to polymers comprising recurring benzimidazole units. Some examples of the extremely advantageous polymers comprising recurring benzimidazole units are represented by the following formulae:

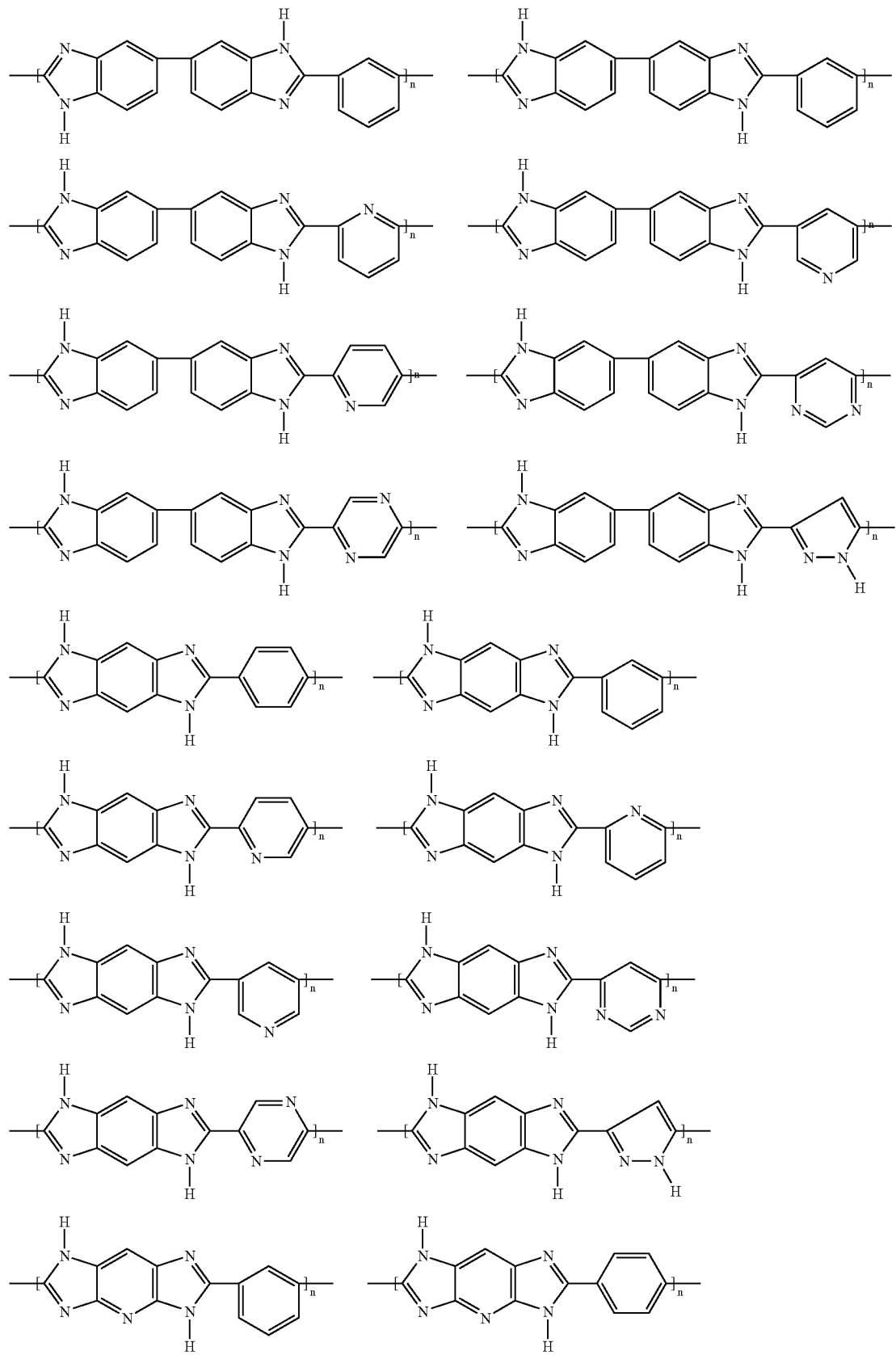

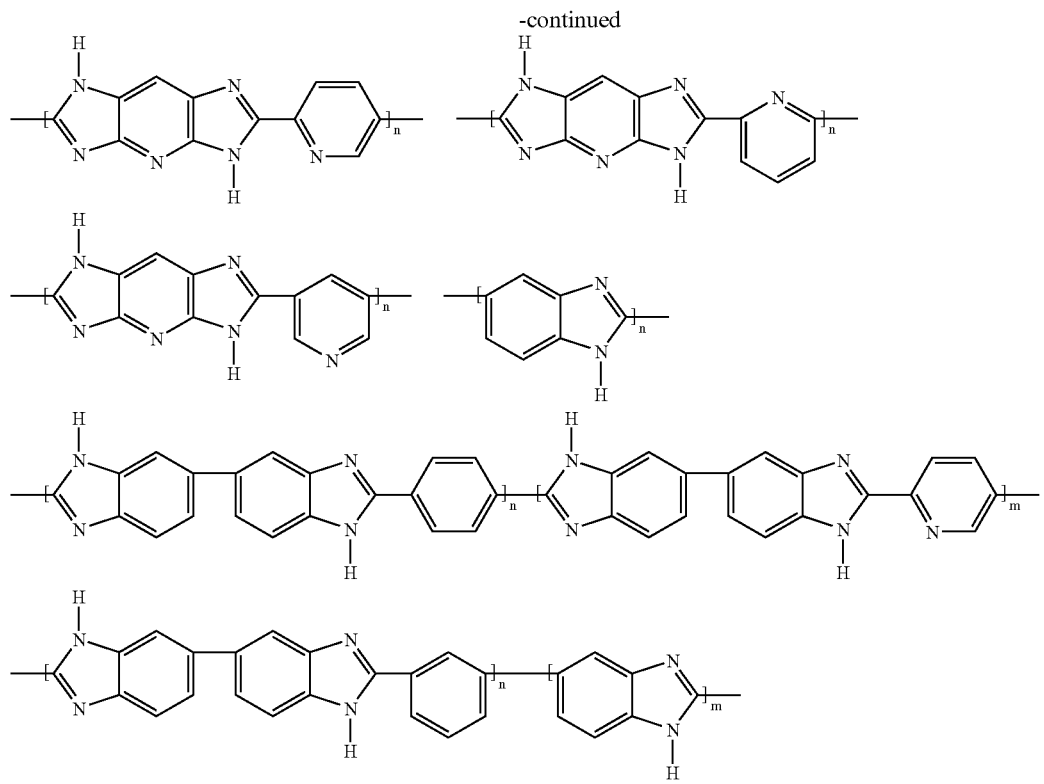
-continued where n and m are each an integer greater than or equal to 10, preferably greater than or equal to 100.

Preferred polyazoles, but in particular the polybenzimidazoles, have a high molecular weight. Measured as intrinsic viscosity, this is at least 1.0 dl/g, preferably at least 1.2 dl/g.

The preparation of such polyazoles is known: one or more aromatic tetraamino compounds are reacted in the melt with one or more aromatic carboxylic acids or esters thereof which contain at least two acid groups per carboxylic acid monomer to form a prepolymer. The prepolymer formed solidifies in the reactor and is subsequently broken up mechanically. The pulverulent prepolymer is usually fully polymerized in a solid-state polymerization at temperatures of up to 400° C. Preferred polybenzimidazoles are commercially available under the trade name ®Celazole from Celanese AG.

To produce polymer films, the polyazole is, in a further step, dissolved in polar, aprotic solvents such as dimethylacetamide (DMAc) and a film is produced by classic methods.

To remove solvent residues, the film obtained in this way can be treated with a washing liquid by means of the process of the invention. This washing liquid is preferably selected from the group consisting of alcohols, ketones, alkanes (aliphatic and cycloaliphatic), ethers (aliphatic and cycloaliphatic), esters, carboxylic acids, with the above members of the group being able to be halogenated, water, inorganic acids (e.g. $H_3PO_4$, $H_2SO_4$) and mixtures thereof.

In particular, C1-C10-alcohols, C2-C5-ketones, C1-C10-alkanes (aliphatic and cycloaliphatic), C2-C6-ethers (aliphatic and cycloaliphatic), C2-C5-esters, C1-C3-carboxylic acids, dichloromethane, water, inorganic acids (e.g. $H_3PO_4$, $H_2SO_4$) and mixtures thereof are used. Among these liquids, water is particularly preferred.

After washing, the film can be dried to remove the washing liquid. Drying is carried out as a function of the partial vapor pressure of the treatment liquid selected. Drying is usually carried out at atmospheric pressure and temperatures of from 20° C. to 200° C. More gentle drying can also be carried out under reduced pressure. In place of drying, the membrane can also be dabbed off and thus freed of excess treatment liquid. The order is not critical.

The above-described freeing of the polyazole film of solvent residues surprisingly improves the mechanical properties of the film. These properties include, in particular, the modulus of elasticity, the tear strength and the fracture toughness of the film.

To give these films the ability to conduct protons, they are doped with an acid. The present process is particularly useful for this purpose, too. In this context, acids include all known Lewis and Brønsted acids, preferably inorganic Lewis and Brønsted acids.

Furthermore, the use of polyacids, in particular isopolyacids and heteropolyacids, and of mixtures of various acids is also possible. For the purposes of the present invention, heteropolyacids are inorganic polyacids which have at least two different central atoms and are formed as partial mixed anhydrides from in each case weak, polybasic oxo acids of a metal (preferably Cr, Mo, V, W) and a nonmetal (preferably As, I, P, Se, Si, Te). They include, inter alia, 12-molybdophosphoric acid and 12-tungstophosphoric acid.

The conductivity of the polymer of the invention can be influenced via the degree of doping. The conductivity increases with increasing concentration of dopant until a maximum value has been reached. According to the invention, the degree of doping is reported as mole of acid per mole of repeating units of the polymer. For the purposes of the present invention, a degree of doping of from 3 to 15, in particular from 6 to 12, is preferred.

Dopants which are particularly preferred according to the invention are sulfuric acid and phosphoric acid. A very particularly preferred dopant is phosphoric acid ($H_3PO_4$). Highly concentrated acids are generally used here. According to a particular aspect of the present invention, the concentration of the phosphoric acid is at least 50% by weight, in particular at least 80% by weight, based on the weight of the dopant.

Furthermore, it is possible to replace some or all of the acid by monomers containing vinylphosphonic acid and/or vinylsulfonic acid groups and thus bring about swelling of the film. The swollen film is subsequently polymerized as described in the German patent application 10210499.2 or 10209419.5.

The film is passed through a liquid bath at least twice, preferably at least 10 times and particularly preferably at least 25 times, with the direction of travel of the film being changed by altering the direction of rotation of the spools.

The speed at which the film is conveyed through the liquid depends on the type of liquid and on the film. In general, the film is drawn through the liquid bath at a speed of from 0.5 to 100 m/min, in particular from 1.0 to 25 m/min.

The length of the path of the film through the liquid is preferably from 0.05 to 10 m, in particular from 0.15 m to 2 m.

In a particular embodiment of the present invention, the treatment time is in the range from 2 minutes to 10 hours, preferably in the range from 15 minutes to 3 hours.

The speed at which the film is conveyed through the bath of liquid can be controlled in a manner known per se. Suitable methods include, inter alia, control of the speed of rotation of the spools via a speed indicator roller or by measuring their rotation rate.

In a particular embodiment of the present invention, particularly uniform, smooth and crease-free rolling up of the film is achieved by means of the drawback force. The film is preferably conveyed through the trough filled with liquid with a drawback force per unit width of the film in the range from 0.5 to 200 N/m, preferably from 1 to 150 N/m and particularly preferably in the range from 12 to 60 N/m. The width is in this case the dimension of the film perpendicular to the direction of travel prior to treatment with liquid. Based on film having a width in the range from 20 cm to 200 cm, preferred drawback forces are thus in the range from 0.1 to 400 N, in particular from 0.2 to 300 N and particularly preferably from 2.4 to 120 N, without this constituting a restriction.

According to a particular aspect of the present invention, liquid adheres to the film after the first treatment, with preference being given to at least 1 $g/m^2$, in particular at least 10 $g/m^2$, of liquid remaining on the film after the first treatment. This value is based on the increase in weight resulting from the treatment with liquid.

In the treatment of the film with a washing liquid, for example water, it is preferred that from 1 to 1000 $ml/m^2$, in particular from 5 to 250 $ml/m^2$, particularly preferably from 15 to 150 $ml/m^2$ and very particularly preferably from 25 to 75 $ml/m^2$, adhere to the film, without this constituting a restriction. If the film is being doped with an acid, for example phosphoric acid, it is preferred that from 1 to 1000 $ml/m^2$, in particular from 10 to 800 $ml/m^2$, particularly preferably from 50 to 600 $ml/m^2$ and very particularly preferably from 100 to 400 $ml/m^2$, adhere to the film. The amount of liquid which adheres to the film after a treatment in the bath of liquid and penetrates into the film can be controlled via the speed with which the film is conveyed through the bath of liquid.

Furthermore, the amount of liquid is dependent on the temperature at which the treatment is carried out. The temperature at which the present process is carried out is not critical and can therefore vary within a wide range. However, the present process is generally carried out in the range from 0 to 150° C., preferably from 10° C. to 100° C., with the ranges depending on the physical properties of the liquid.

In a particular embodiment, the liquid present in the trough can, if necessary, be renewed or be replaced by another liquid. In this way, it is possible, for example, to replace a contaminated liquid by a fresh liquid of the same type. Furthermore, the liquid can be replaced by another liquid. This measure enables a film to be both washed and doped without another apparatus having to be used. This procedure can be carried out batchwise or continuously, with individual components also being able to be added.

Jiggers as are described, for example, in Dietmar Fries, training material, teaching aids "Textilveredelung, Beschichten", Arbeitgeberkreis Gesamttextil AGK (1992) p. 2.13, are particularly suitable for carrying out the present process. These apparatuses are commercially available from, inter alia, the companies Mathis AG and Kuester AG.

The present invention is illustrated below for use of a jigger shown schematically in FIG. 1, without this description restricting the invention.

A polyazole film (1) is unrolled from a spool (2) and rolled up on a second spool (3) and in the process conveyed, for example, over a roller (4). The film is conveyed through a trough (5) and there passed around a roller (6). In the trough, the film is treated with liquid. After the film has left the trough and been passed around a further roller, excess liquid can, if desired, be removed by means of pressure generated by means of a further roller (7) before the film is rolled up. Liquid generally adheres to the polyazole films, so that this liquid acts on the film even in the rolled-up state.

All parts of the jigger which come into contact with the liquid can be made of nonrusting material. This is particularly advantageous in doping of the film with concentrated acids. The rollers and spools can accordingly be made of, for example, stainless steel.

The speed of and/or the drawback force on the film can, for example, be determined by means of the rollers (4) and/or (6), which are/is then designed as speed indicator roller or tensiometer roller. In addition, the apparatus can be provided with an electronic control system which regulates the speed and the direction of rotation of the rollers. The apparatus can in this way be designed so that it automatically changes the direction of travel after all the film (1) has been transported from one spool (2) to the second spool (3).

Furthermore, means of controlling the temperature of the jigger, in particular the trough (5), can be provided, with the heat energy introduced into the rolled-up film also depending, in particular, on the speed of rotation of the spools (2) and (3).

Furthermore, the jigger can have a cover (8) which encloses the trough and the spools and isolates them from the environment. Volatilization of the liquid can be prevented in this way. Furthermore, hygroscopic liquids, for example concentrated phosphoric acid, can be protected from moisture, in which case the jigger can be purged with dry air or with nitrogen.

The invention is illustrated below by means of an example and a comparative example, without the invention being restricted to these examples.

EXAMPLE 1

A model WJ 650 jigger from Mathis AG was supplied with about 20 m of PBI film which had a width of 42 cm and contained about 25% by weight of DMAc. The trough of the jigger was filled with 3 l of water. The water of the jigger was heated to 80° C. The film was treated thirty times with the water. The jigger was operated at 3.0 m/min at a drawback force of 10 N, with the film being immersed for about 5 s each time (length of the path through the liquid: about 25 cm).

The residual solvent content of the film was determined by Karl Fischer (KF) titration. Using a Mettler-Toledo apparatus, the water content of the film is determined directly by KF titration, as follows. The specimen located in a closed sample bottle is heated to 250° C. and dried at this temperature. The gas liberated in this way is passed directly into a closed titration vessel and analyzed using Karl Fischer [KF] reagent. In addition to the determination of the water content, the residual solvent content is determined by gravimetric determination of the weight before and after drying. The DMAc content after the treatment was 0.0%.

COMPARATIVE EXAMPLE 1

The PBI film used in Example 1 was dried in a conventional manner at 40° C.

The DMAc content measured by the KF method after the treatment was 2%.

The invention claimed is:

1. A process for producing proton conducting membranes which comprises passing a polyazole film at least twice through a trough filled with a liquid, with the film being unrolled from a spool and rolled up on a further spool and the direction of travel of the film is changed during the treatment by altering the direction of rotation of the spools and wherein the liquid comprises an acid to give the film the ability to conduct protons.

2. The process as claimed in claim 1, characterized in that the liquid in the trough is changed after the first treatment.

3. The process as claimed in claim 1, characterized in that liquid adheres to the film after the first treatment.

4. The process as claimed in claim 3, characterized in that at least 1 g/m$^2$ of liquid adheres to the film.

5. The process as claimed in claim 1, characterized in that the liquid comprises water.

6. The process as claimed in claim 1, characterized in that the liquid comprises acid.

7. The process as claimed in claim 6, characterized in that the acid is phosphoric acid and the monomer containing vinylsulfonic acid groups is vinylsulfonic acid and the monomer containing vinylphosphonic acid groups is vinylphosophonic acid.

8. The process as claimed in claim 1, characterized in that the film is passed through the bath of liquid at least 10 times.

9. The process as claimed in claim 1, characterized in that the film is passed through the bath of liquid at a speed of from 0.5 to 100 m/min.

10. The process as claimed in claim 1, characterized in that the film is conveyed with a drawback force per unit width of the film in the range from 0.5 to 200 N/m.

11. The process as claimed in claim 1, characterized in that the film is treated for from 15 minutes to 3 hours.

12. The process as claimed in claim 1, characterized in that a jigger is used for the treatment of polyazole films.

13. The process as claimed in claim 2, characterized in that liquid adheres to the film after the first treatment.

14. The process as claimed in claim 13, characterized in that at least 10 g/m$^2$ of liquid adheres to the film.

15. The process as claimed in claim 14, characterized in that the liquid comprises water and from 25 to 75 ml/m$^2$ of water adhere to film.

16. The process as claimed in claim 15, characterized in that the liquid comprises acid, monomers containing vinylsulfonic acid and/or monomers containing vinylphosphonic acid groups.

17. The process as claimed in claim 16, characterized in that the acid is phosphoric acid and the monomer containing vinylsulfonic acid groups is vinylsulfonic acid and the monomer containing vinylphosphonic acid groups is vinylphosophonic acid.

18. The process as claimed in claim 17, characterized in that the film is passed through the bath of liquid at least 25 times at a speed of from 1.0 to 25 m/min.

19. The process as claimed in claim 18, characterized in that the film is conveyed with a drawback force per unit width of the film in the range from 12 to 60 N/m and the film is treated for from 15 minutes to 3 hours.

20. The process as claimed in claim 19, characterized in that a jigger is used for the treatment of polyazole films.

21. The process as claimed in claim 1, wherein the acid is monomers containing vinylsulfonic acid and/or monomers containing vinylphosphonic acid groups.

* * * * *

UNITED STATES PATENT AND TRADEMARK OFFICE
CERTIFICATE OF CORRECTION

PATENT NO. : 7,244,811 B2 Page 1 of 1
APPLICATION NO. : 10/522503
DATED : July 17, 2007
INVENTOR(S) : Joachim Petersen It is certified that error appears in the above-identified patent and that said Letters Patent is hereby corrected as shown below:

On the Title Page (56):

In the Reference Cited, please insert under the heading U.S. patent documents

-- 5,774,755    03-2005    Herron et al.    427/096.1--.

Signed and Sealed this

Eighteenth Day of December, 2007

JON W. DUDAS
*Director of the United States Patent and Trademark Office*